UNITED STATES PATENT OFFICE.

KARL SCHIRMACHER, OF HÖCHST-ON-THE-MAIN, AND RICHARD LEOPOLD, OF HOCHHEIM-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

GREEN TO BLACK VAT DYESTUFF.

1,001,457.    Specification of Letters Patent.   Patented Aug. 22, 1911.

No Drawing.   Application filed October 3, 1910. Serial No. 585,120.

*To all whom it may concern:*

Be it known that we, KARL SCHIRMACHER, Ph. D., chemist, and RICHARD LEOPOLD, Ph. D., chemists, citizens of the Empire of Germany, residing at Höchst-on-the-Main, Germany, and Hochheim-on-the-Main, Germany, respectively, have invented certain new and useful Improvements in Green to Black Vat Dyestuffs, of which the following is a specification.

Whereas, by introducing substituents into the thioindigo molecule, it is possible to vary the tints of the dyestuffs of the thioindigo series from orange to black, this quality has not been observed in the dyestuffs of the indigo series, the color of all the indigo derivatives hitherto known being blue or purple. Now, we have found that dyestuffs of other tints are obtained by introducing alkylthio groups into the indigo molecule in the "meta" position to the nitrogen. Such indigo derivatives are obtained by subjecting to oxidation those indoxyl derivatives which can be produced from 5-alkylthio-phenyl-1-glycin-2-carboxylic acid, and they are dark-green to black vat dyestuffs which can be easily reduced to vats and dye in the vat cotton and wool fast tints.

The formula of the new dyestuffs is as follows:

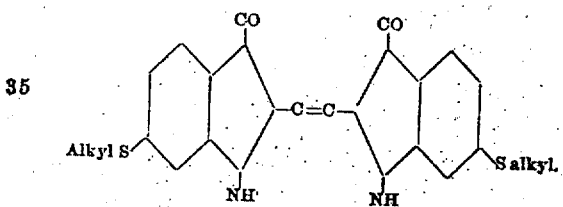

The following example illustrates our invention: 100 parts by weight of the acid sodium salt of 5-ethylthio-phenyl-1-glycrin-2-carboxylic acid, produced by the action of chloracetic acid on ethylthio-anthranilic acid

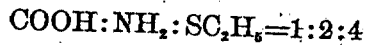

(described in French Patent No. 384,418) are heated to boiling for a short time with about 500 parts of acetic anhydrid in a reflux-apparatus. After the mass has cooled it is added to about 50 times its quantity of water. The mixture is then rendered caustic-alkaline with caustic soda lye and heated, while well stirring and blowing air into the caustic-alkaline solution, until the dyestuff is completely separated.

The dyestuff is when dry a dark greenish-black powder, soluble in concentrated sulfuric acid with a green coloration of a blue hue, soluble in glacial acetic acid with a green and in alcohol and nitrobenzene with a red coloration of a green dichroism; it is readily reducible and dyes cotton and wool in the vat, with subsequent oxidation in the air, green to black tints.

Having now particularly described our invention, what we claim is:

1. As new products the 6.6'dialkylthio derivatives of indigo, being greenish-black powders, soluble in concentrated sulfuric acid or glacial acetic acid with a green coloration and yielding a dichroistic solution of a brownish-red to green color when dissolved in alcohol or nitrobenzene, readily soluble in alkaline hydrosulfite with a yellow color and dyeing cotton and wool green to black tints.

2. As a new product, the 6.6'diethylthio derivative of indigo, being a greenish-black powder, soluble in concentrated sulfuric acid with a bluish-green coloration, in glacial acetic acid with a green coloration and yielding in alcohol or nitrobenzene a dichroistic solution of a brownish-red to green coloration, readily soluble in alkaline hydrosulfite with a yellow coloration and dyeing cotton and wool green to black tints.

In testimony whereof, we affix our signatures in presence of two witnesses.

KARL SCHIRMACHER.
RICHARD LEOPOLD.

Witnesses:
JEAN GRUND,
CARL GRUND.